United States Patent
Lee et al.

(10) Patent No.: US 9,958,598 B2
(45) Date of Patent: May 1, 2018

(54) LIGHT SOURCE MODULE

(71) Applicant: Young Lighting Technology Inc., Hsin-Chu (TW)

(72) Inventors: Hsin-Hung Lee, Hsin-Chu (TW); Yi-Yu Tsai, Hsin-Chu (TW); Chiao-Chih Yang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 54 days.

(21) Appl. No.: 15/068,629

(22) Filed: Mar. 13, 2016

(65) Prior Publication Data
US 2016/0299285 A1   Oct. 13, 2016

(30) Foreign Application Priority Data
Apr. 13, 2015   (TW) .............................. 104111799 A

(51) Int. Cl.
*F21V 7/04* (2006.01)
*F21V 8/00* (2006.01)

(52) U.S. Cl.
CPC ......... *G02B 6/0088* (2013.01); *G02B 6/0036* (2013.01); *G02B 6/0055* (2013.01); *G02B 6/0058* (2013.01); *G02B 6/0043* (2013.01)

(58) Field of Classification Search
CPC .... G02B 6/0036; G02B 6/004; G02B 6/0043; G02B 6/0055; G02B 6/0058; G02B 6/0088

See application file for complete search history.

(56) References Cited

U.S. PATENT DOCUMENTS

| | | | |
|---|---|---|---|
| 6,002,829 A * | 12/1999 | Winston | F21V 5/02 385/129 |
| 6,406,158 B1 | 6/2002 | Ohkawa | |
| 2006/0146573 A1* | 7/2006 | Iwauchi | G02B 6/0018 362/621 |

(Continued)

FOREIGN PATENT DOCUMENTS

| CN | 101440935 | 5/2009 |
|---|---|---|
| CN | 101749597 | 6/2010 |

(Continued)

OTHER PUBLICATIONS

"Office Action of Taiwan Counterpart Application," dated Mar. 21, 2016, p. 1-p. 6, in which the listed references were cited.

*Primary Examiner* — Alexander Garlen
(74) *Attorney, Agent, or Firm* — JCIPRNET

(57) ABSTRACT

A light source module includes a light guide plate (LGP), at least one light emitting element, a reflector, and a plurality of spacer units. The LGP has a first surface, a second surface opposite to the first surface, a light incident surface connecting the first surface and the second surface, and a plurality of optical microstructures. The light emitting element is located adjacent to the light incident surface. The reflector is adhered to the second surface through an adhesive gel. The spacer units are located between the LGP and the reflector, and sizes of the spacer units are larger than or equal to 1 micrometer. The adhesive gel includes a first adhesive gel and a second adhesive gel. The first adhesive gel is located between the spacer units and the LGP, and the second adhesive gel is located between the spacer units and the reflector.

15 Claims, 3 Drawing Sheets

(56) References Cited

U.S. PATENT DOCUMENTS

| | | | | |
|---|---|---|---|---|
| 2010/0157623 A1* | 6/2010 | Tanahashi | ............ | G02B 6/0043 362/606 |
| 2011/0096567 A1* | 4/2011 | Tiao | .................... | G02B 6/0043 362/607 |
| 2011/0122494 A1* | 5/2011 | Sherman | ................ | G02B 5/128 359/530 |
| 2011/0163066 A1* | 7/2011 | Choi | .................... | B32B 37/226 216/36 |
| 2012/0287677 A1* | 11/2012 | Wheatley | ............ | G02B 6/0051 362/627 |
| 2013/0100704 A1* | 4/2013 | Kykta | ..................... | B05D 5/06 362/627 |
| 2013/0128150 A1* | 5/2013 | Que | ................ | G02F 1/133308 349/15 |
| 2013/0235614 A1* | 9/2013 | Wolk | .................... | G02B 6/005 362/607 |
| 2014/0169029 A1* | 6/2014 | Wardhana | ............. | G02B 6/005 362/606 |
| 2014/0253845 A1 | 9/2014 | Shibata | | |
| 2015/0131297 A1* | 5/2015 | Thompson | ........... | G02B 6/0053 362/326 |

FOREIGN PATENT DOCUMENTS

| | | | | |
|---|---|---|---|---|
| JP | 2006171585 | 6/2006 | | |
| JP | 2010040514 | 2/2010 | | |
| TW | I296730 | 5/2008 | | |
| TW | 201211637 | 3/2012 | | |
| TW | 201215969 | 4/2012 | | |
| TW | I431346 | 3/2014 | | |
| WO | WO 2012043396 A1 * | 4/2012 | ........... | G02B 5/0242 |

\* cited by examiner

LIGHT SOURCE MODULE

CROSS-REFERENCE TO RELATED APPLICATION

This application claims the priority benefit of Taiwan application serial no. 104111799, filed on Apr. 13, 2015. The entirety of the above-mentioned patent application is hereby incorporated by reference herein and made a part of this specification.

BACKGROUND OF THE INVENTION

Field of the Invention

The invention relates to a light source module, and more particularly to a planar light source module.

Description of Related Art

With the advancement of optoelectronic technologies, cold cathode fluorescent lamps (CCFL) arranged on side surfaces of light guide plates (LGPs) in the conventional art have been gradually replaced by light emitting diode (LED) light bars. The LEDs are characterized by long service lives, low power consumption, fast response speed, etc; hence, light source modules employing the LEDs as the light sources can have the improved performance and the extended service lives.

However, if a normal liquid crystal display (LCD) device is equipped with the light source module utilizing the LED as the light source, the LED device cannot be thinned out to a great extent. This is not only because display effects need be accomplished by an LCD panel but also because mechanical elements are required for fixing the LCD panel and the light source module. As such, the thickness of the normal LCD is scarcely comparable to that of a self-luminescent LED display device. As the size of the display device increases, the difference between the normal LCD and the self-luminescent LED display device becomes more significant.

The description of related art merely serves to understand the invention and thus may include information unknown to people having ordinary skill in the art. What is disclosed in this paragraph does not indicate that the issues to be resolved in one or more embodiments of the invention are already known to or understood by people having ordinary skill in the art before the subject application is filed.

SUMMARY OF THE INVENTION

The invention is directed to a light source module with the reduced thickness.

Other objectives and advantages of the invention can be further illustrated by the technical features broadly embodied and described as follows.

To achieve one, a part, or all of the above advantages or other advantages, an embodiment of the invention provides a light source module. The light source module includes a light guide plate (LGP), at least one light emitting element, a reflector, and a plurality of spacer units. The LGP has a first surface, a second surface opposite to the first surface, a light incident surface connecting the first surface and the second surface, and a plurality of optical microstructures. The at least one light emitting element is located adjacent to the light incident surface. The reflector is adhered to the second surface of the LGP through an adhesive gel. The spacer units are arranged between the LGP and the reflector, such that a distance is between the LGP and the reflector. Sizes of the spacer units are greater than or equal to 1 micrometer. The adhesive gel includes a first adhesive gel and a second adhesive gel. The first adhesive gel is located between the spacer units and the LGP, and the second adhesive gel is located between the spacer units and the reflector.

In view of the above, the light source module provided in an embodiment of the invention may achieve at least one of advantages or effects as listed below. Specifically, in the light source module described in an embodiment of the invention, the reflector is adhered to the LGP, and the spacer units are located between the LGP and the reflector, so as to effectively reduce the thickness of the light source module without sacrificing the initial light emitting efficiency and light uniformity of the light source module. Besides, as described herein, the spacer units located between the LGP and the reflector may serve to prevent the LGP from directly contacting the reflector, so that the light uniformity of the light source module is not affected. Moreover, the structural strength of the light source module may be further enhanced or adjusted by properly selecting the materials of the first adhesive gel and the second adhesive gel and the materials of the substrate, the reflector, and the LGP.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the figure(s) being described. The components of the invention can be positioned in a number of different orientations. As such, the directional terminology is used for purposes of illustration and is in no way limiting.

Figure 1:
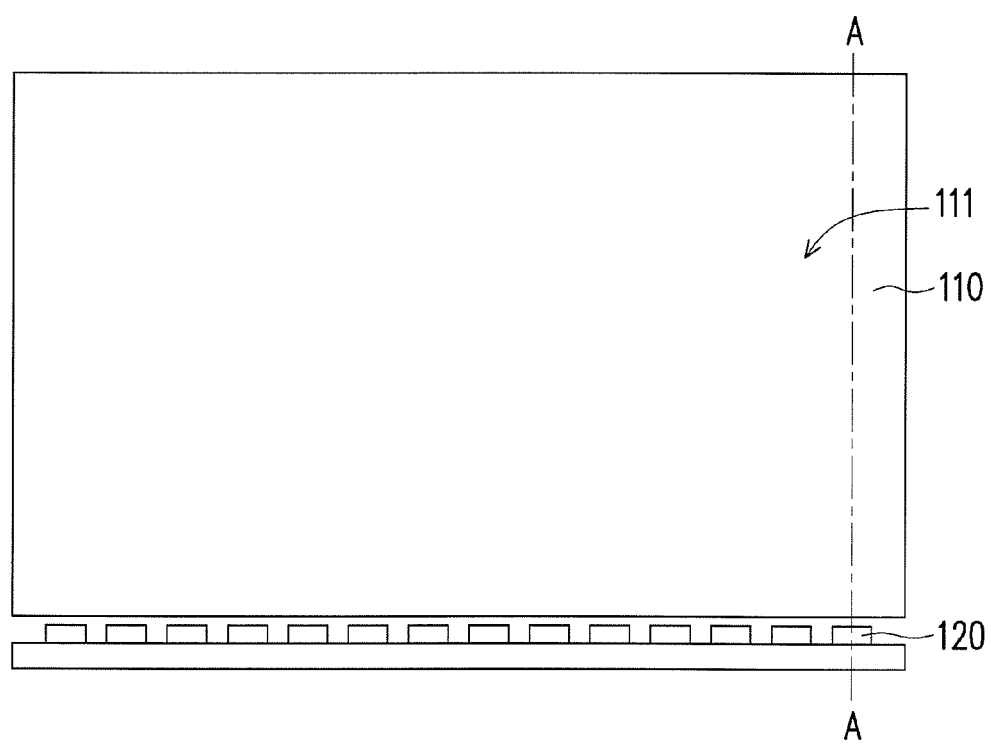
FIG. 1 is a schematic front view of a light source module according to an embodiment of the invention.
Figure 2:
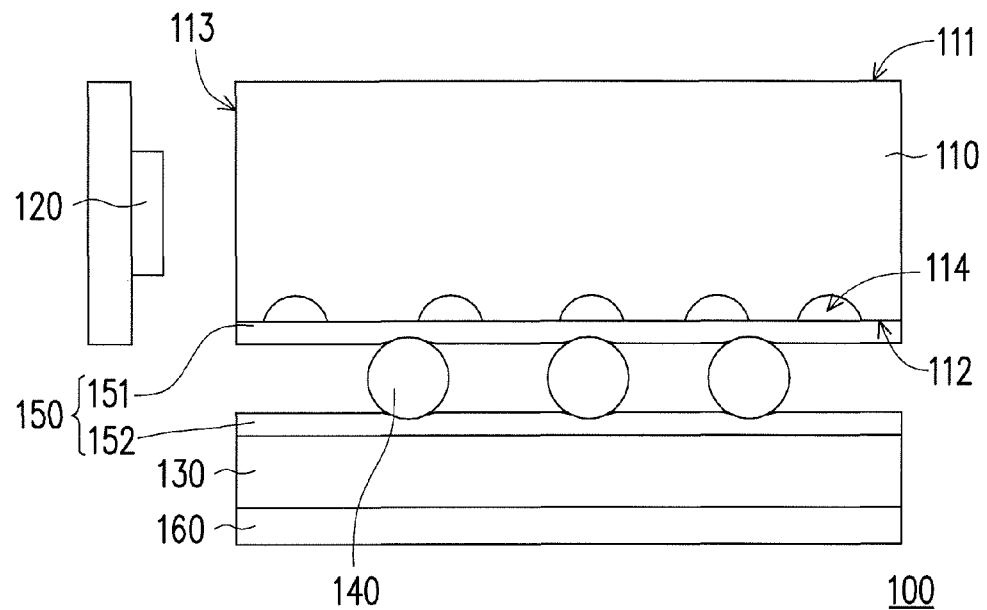
FIG. 2 is a cross-sectional view illustrating the light source module depicted in FIG. 1 and taken along a line A-A.

On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive FIG. 1 is a schematic front view of a light source module according to an embodiment of the invention. FIG. 2 is a cross-sectional view illustrating the light source module depicted in FIG. 1 and taken along a line A-A. With reference to FIG. 1 and FIG. 2, in the present embodiment, the light source module 100 includes a light guide plate (LGP) 110, at least one light emitting element 120, a reflector 130, and a plurality of spacer units 140. In the present embodiment, the LGP 110 may be made of at least one of glass and an acrylic or made of any other material characterized by high transparency. The light emitting element 120 may be a light emitting diode (LED) or an LED light bar, which should however not be construed as a limitation to the invention.

Specifically, as shown in FIG. 2, the LGP 110 has a first surface 111, a second surface 112 opposite to the first surface 111, a light incident surface 113 connecting the first surface 111 and the second surface 112, and a plurality of optical microstructures 114. The at least one light emitting element 120 is located adjacent to the light incident surface 130. After the beam (not shown) emitted by the light emitting element 120 enters the LGP 110 via the light incident surface 113, the beam moves forward in the LGP 110. Particularly, in the present embodiment, the optical microstructures 114 of the LGP 110 are located on the second surface 112, so as to destroy the total reflection of the beam moving forward in the LGP 110. Thereby, while the beam is moving forward in the LGP 110, the beam can be scattered and can then leave the LGP 110 via the first surface 111 of the LGP 110, so as to provide the required light source. Here, the first surface 111 is, for instance, a light output surface of the LGP 110.

In the present embodiment, for instance, the optical microstructures 114 are mesh point structures, and a method for forming the optical microstructures 114 includes forming the mesh point structures shaped as cavities on the second surface 112 of the LGP 110 by screen printing or laser etching. However, the invention is not limited thereto, the optical microstructures 114 located on the second surface 112 of the LGP 110 may be of other types or may be formed by applying other manufacturing methods, e.g., by forming protruding mesh point structures by inkjet printing. The types of the optical microstructures and the method of forming the optical microstructures are not limited to those described herein.

In addition, the optical microstructures 114 located on the second surface 112 of the LGP 110 mainly serve to scatter the beam transmitted to the second surface 112, so as to lead the beam to move out of the first surface 111 of the LGP 110. Hence, in the area where the distribution density of the optical microstructures 114 is rather high, more of the beam is guided out of the LGP 110. It can be deduced from the above that the distribution density of the optical microstructures 114 in the area where the light intensity is high can be relatively low, so as to ensure the overall brightness of the light source module 100 to be uniform. By contrast, the distribution density of the optical microstructures 114 in the area where the light intensity is low can be relatively high. That is, in the present embodiment, the distribution density of the optical microstructures 114 increases in a direction away from the light incident surface 113, i.e., as the distance from the optical structures 114 to the light incident surface 113 increases, the distribution density of the optical microstructures 114 increases as well.

Specifically, as shown in FIG. 2, in the present embodiment, the reflector 130 is adhered to the second surface 112 of the LGP 110 through an adhesive gel 150. The spacer units 140 are arranged between the LGP 110 and the reflector 130, such that a distance is between the LGP 110 and the reflector 130. Sizes of the spacer units 140 are greater than or equal to 1 micrometer, and the spacer units 140 are randomly distributed between the LGP 110 and the reflector 130. The spacer units 140 are shaped as balls, whereas the invention is not limited thereto; in another embodiment, the spacer units 140 may be shaped as columns, i.e., a shape of the spacer units 140 may be at least one of the ball shape and the column shape. A material of the spacer units 140 may be at least one of a plastic and glass. As shown in FIG. 2, specifically, the adhesive gel 150 includes a first adhesive gel 151 and a second adhesive gel 152. The first adhesive gel 151 is located between the spacer units 140 and the LGP 110, and the second adhesive gel 152 is located between the spacer units 140 and the reflector 130. For instance, in the present embodiment, the adhesive gel 150 and the spacer units 140 are made of transparent materials, such that the beam may be transmitted to the reflector 130 and then reflected by the reflector 130 back to the LGP 110. However, the invention is not limited thereto.

In the present embodiment, the reflector 140 located below the second surface 112 of the LGP 110 may reflect a portion of the beam scattered to the reflector 140 back to the LGP 110 and may then transmit the portion of the beam to the outside. Namely, after the portion of the beam is reflected by the reflector 130, the portion of the beam may be transmitted to the surroundings via the LGP 110, which further enhance the light utilization efficiency.

Through the arrangement of adhering the reflector 130 to the LGP 110, the thickness of the light source module 100 can be effectively reduced without sacrificing the initial light emitting efficiency of the light source module 100. Besides, due to the arrangement of the spacer units 140, a distance is between the LGP 110 and the reflector 130, such that the LGP 110 is prevented from directly contacting the reflector 130, and that the light uniformity of the light source module 100 is not affected. To be specific, the arrangement of the spacer units 140 allows an air layer to be located between the LGP 110 and the reflector 130, such that the total reflection of the beam moving forward in the LGP 110 is not destroyed, and that favorable efficiency of the light source module 100 can be ensured. The total reflection is not destroyed until the beam arrives at the optical microstructures 114.

Additionally, based on the principle of electromagnetic waves, when a beam propagates from an optical dense medium (i.e., medium having high refractive index) to an optical less dense medium (i.e., medium having low refractive index) and results in the total reflection, an evanescent wave may still be generated on the interface where the total reflection is generated, and the intensity of the evanescent wave is exponentially attenuated as the evanescent wave moves. Hence, if the distance between the LGP 110 and the reflector 130 is less than a wavelength of a visible beam (e.g., 400 nm-700 nm), the energy of the evanescent wave is transmitted to the reflector 130 and reflected back to the LGP 110, which affects the uniformity of the beam. In response thereto, the sizes of the spacer units 140 described herein are greater than 700 nm, for instance, preferably greater than or equal to 1 µm. Thereby, the influence of the evanescent wave on the light uniformity of the light source module 100 can be lessened.

Particularly, in the present embodiment, the first adhesive gel 151 and the second adhesive gel 152 may be selectively made of the same material or different materials. For instance, in the present embodiment, the reflector 130 is made of polyethylene terephthalate (PET) or any other appropriate material; if the LGP 110 is made of glass, the first adhesive gel 151 may be made of an acid ester compound with high viscosity, e.g., NOA65, a photopolymer manufactured by Norland Products, so as to prevent droplet shrinkage on the surface of the glass (the droplet shrinkage often results from the wet adhesive); besides, the optical refractive index of the acid ester compound with high viscosity is similar to that of the glass. By contrast, the second adhesive gel 152 may be made of an acid ester compound with low viscosity, such as NOA72, another photopolymer manufactured by Norland Products. However, the invention is not limited thereto; the wet first adhesive gel 151 and the wet second adhesive gel 152 may be in form of adhesive films in liquid or solid state, such that the adhesion area between the gels 151 and 152 and the spacer units 140 can be increased. If, however, the LGP 110 is made of polymethylmethacrylate (PMMA) or any other polymer material, the first adhesive gel 151 may be have relatively low viscosity. According to the present embodiment, viscosity of the first adhesive gel 151 is preferably within a range from 1000 CPS to 20000 CPS, and viscosity of the second adhesive gel 152 is preferably within a range from 10 CPS to 500 CPS. The materials of the first adhesive gel 151 and the second adhesive gel 152 may be selected in response to the materials of the LGP 110 and the reflector 130, and thereby the structural strength of the light source module 100 can be enhanced. Note that the numerical range provided here is exemplary and is not intended to limit the scope of the invention.

In the present embodiment, the light source module 100 further includes a substrate 160. Here, the reflector 130 is located between the LGP 110 and the substrate 160, and the substrate 160 is adhered to the reflector 130. For instance, in the present embodiment of the invention, a material of the substrate 160 is at least one of metal, glass, and a plastic. Through selecting the proper materials of the substrate 160, the reflector 130, and the LGP 110, the structural strength of the light source module 100 can be further enhanced or adjusted. For instance, if the LGP 110 is made of an acrylic material, the substrate 160 may be made of metal material, so as to further increase the rigidity of the LGP 110; alternatively, if the LGP 110 is made of glass material with high rigidity, the substrate 160 may be made of the plastic material; compared to metal material, the plastic material contributes to the reduced weight, and the LGP 110 made of glass material and the substrate 160 made of the plastic material allow the light source module 100 to still have sufficient structural strength. It should be mentioned that the materials of the LGP 110 and the substrate 160 are not limited herein; in the event that the LGP 110 is made of an acrylic material, the substrate 160 can be made of the plastic material; if the LGP 110 is made of glass material, the substrate 160 can be made of metal material; the substrate 160 can also be made of any other appropriate material, which should however not be construed as a limitation to the invention.

Besides, in the previous embodiments, the optical microstructures 114 of the light source module 100 are located on the second surface 112, and the first adhesive gel 151 and the second adhesive gel 152 are exemplarily separated; however, the invention is not limited thereto. Other embodiments of the light source module are provided hereinafter with reference to FIG. 3 to FIG. 5.

Figure 3:
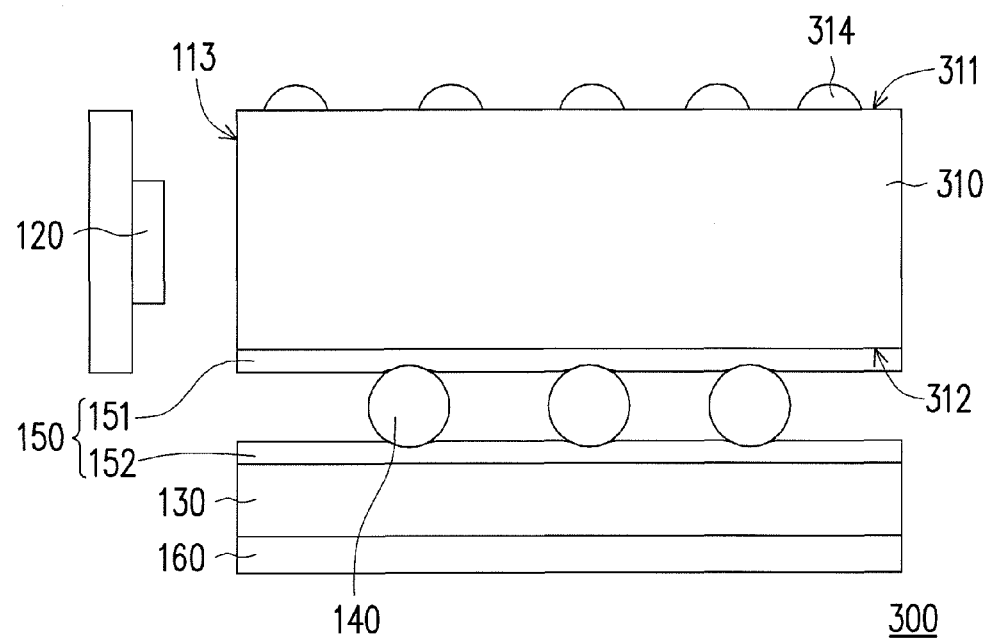
FIG. 3 is a cross-sectional view illustrating a light source module according to another embodiment of the invention.

FIG. 3 is a cross-sectional view illustrating a light source module according to another embodiment of the invention. With reference to FIG. 3, the light source module 300 depicted in FIG. 3 and described in the present embodiment is similar to the light source module 100 depicted in FIG. 2, and the differences between the light source modules 300 and 100 are described below. As shown in FIG. 3, in the present embodiment, the optical microstructures 314 of the light source module 300 are located on the first surface 311 and are protrusive mesh point structures protruding from the first surface 311; however, the invention is not limited thereto. The optical microstructures 314 can also be mesh point structure shaped as cavities sinking in the first surface 311, and the optical microstructures 314 can also be arranged on the second surface 312. As such, the light source module 300 may utilize the optical microstructures 314 of the LGP 310 to destroy the total reflection of the beam moving forward within the LGP 310 and scatter said beam, and the beam can thus leave the LGP 310 through the first surface 311 of the LGP 310 and can provide the light source required by the surroundings.

In the light source module 300 described in the present embodiment of the invention, the reflector 130 is adhered to the LGP 310, and the spacer units 140 are located between the LGP 310 and the reflector 130, so as to effectively reduce the thickness of the light source module 300 without sacrificing the initial light emitting efficiency and light uniformity of the light source module 300. Besides, the structural strength of the light source module 300 may be further enhanced or adjusted by properly selecting the materials of the first adhesive gel 151 and the second adhesive gel 152 and the materials of the substrate 160, the reflector 130, and the LGP 310. As such, the light source module 300 and the light source module 100 can both have similar advantages and accomplish similar effects, which thus will not be further elaborated below.

Figure 4:
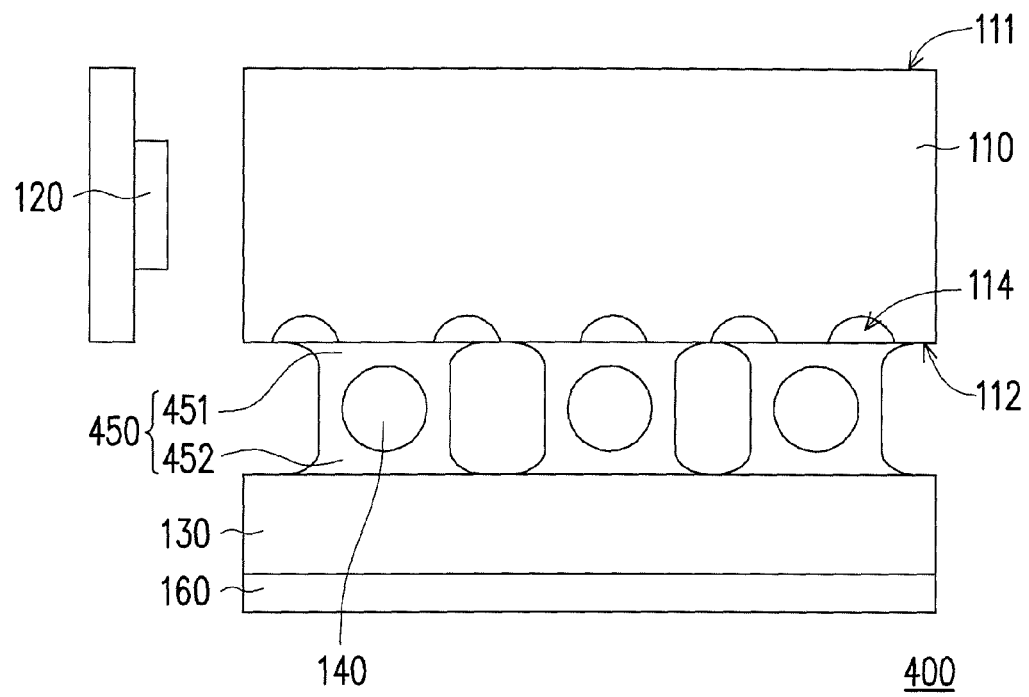
FIG. 4 is a cross-sectional view illustrating a light source module according to still another embodiment of the invention.
Figure 5:
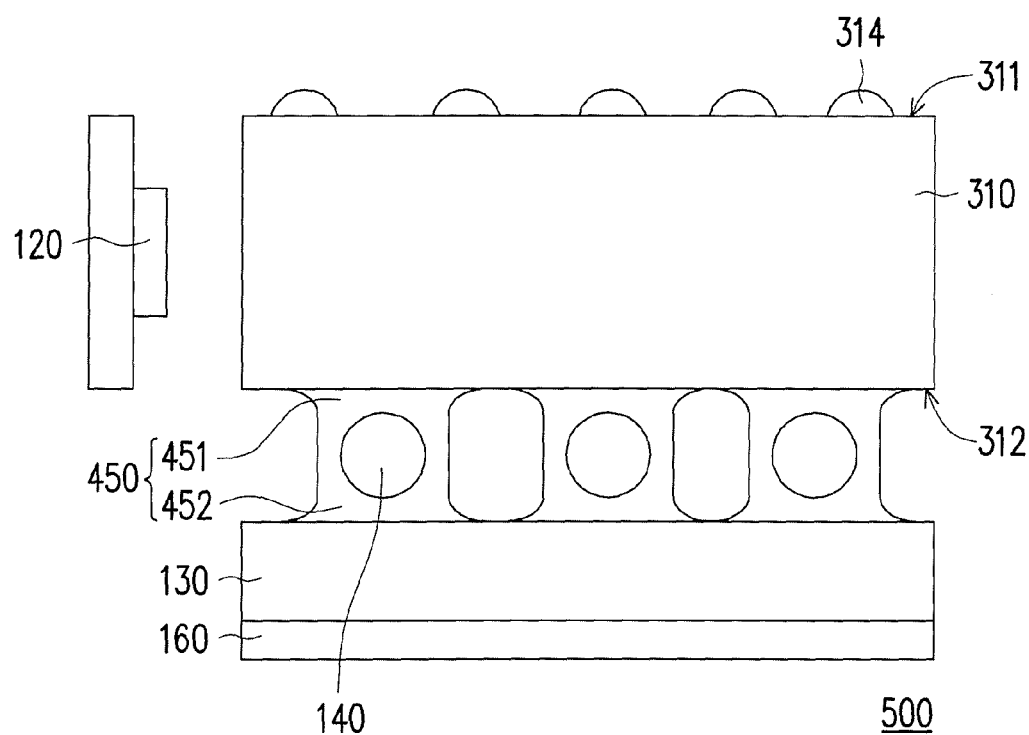
FIG. 5 is a cross-sectional view illustrating a light source module according to still another embodiment of the invention.

FIG. 4 is a cross-sectional view illustrating a light source module according to still another embodiment of the invention. FIG. 5 is a cross-sectional view illustrating a light source module according to still another embodiment of the invention. With reference to FIG. 4 and FIG. 5, the light source module 400 depicted in FIG. 4 and the light source module 500 depicted in FIG. 5 are respectively similar to the light source module 100 depicted in FIG. 2 and the light source module 300 depicted in FIG. 3; therefore, same elements are marked by same reference numbers, whereas the differences are described below. As shown in FIG. 4 and FIG. 5, in the present embodiment, the first adhesive gel 451 and the second adhesive gel 452 of the adhesive gel 450 together encapsulate the spacer units 140. In the light source module 400/500 described in the present embodiment of the invention, the reflector 130 can be adhered to the LGP 110/310, and the spacer units 140 are located between the LGP 110/310 and the reflector 130, so as to effectively reduce the thickness of the light source module 400/500 without sacrificing the initial light emitting efficiency and light uniformity of the light source module 400/500. Besides, the structural strength of the light source module 400/500 may be further enhanced or adjusted by properly selecting the materials of the first adhesive gel 451 and the second adhesive gel 452 and the materials of the substrate 160, the reflector 130, and the LGP 110/310. As such, the light source module 400/500 and the light source module 100/300 can have similar advantages and accomplish similar effects, which thus will not be further elaborated below.

To sum up, in the light source module described in an embodiment of the invention, the reflector is adhered to the LGP, and the spacer units are located between the LGP and the reflector, so as to effectively reduce the thickness of the light source module without sacrificing the initial light emitting efficiency and light uniformity of the light source module. Besides, as described herein, the spacer units located between the LGP and the reflector may serve to prevent the LGP from directly contacting the reflector, so that the light uniformity of the light source module is not affected. Moreover, the structural strength of the light source module may be further enhanced or adjusted by properly selecting the materials of the first adhesive gel and the second adhesive gel and the materials of the substrate, the reflector, and the LGP.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module comprising:
   a light guide plate having a first surface, a second surface opposite to the first surface, a light incident surface connecting the first surface and the second surface, and a plurality of optical microstructures;
   at least one light emitting element located adjacent to the light incident surface;
   a reflector adhered to the second surface of the light guide plate through an adhesive gel; and
   a plurality of spacer units arranged between the light guide plate and the reflector, such that a distance is between the light guide plate and the reflector, sizes of the spacer units being greater than or equal to 1 micrometer, wherein the adhesive gel comprises a first adhesive gel and a second adhesive gel, the first adhesive gel is located between the spacer units and the light guide plate, and the second adhesive gel is located between the spacer units and the reflector, wherein viscosity of the first adhesive gel is greater than viscosity of the second adhesive gel.

2. The light source module of claim 1, wherein the first adhesive gel and the second adhesive gel together encapsulate the spacer units.

3. The light source module of claim 1, wherein a material of the first adhesive gel and a material of the second adhesive gel are different.

4. The light source module of claim 1, wherein viscosity of the first adhesive gel is within a range from 1000 CPS to 20000 CPS.

5. The light source module of claim 1, wherein viscosity of the second adhesive gel is within a range from 10 CPS to 500 CPS.

6. The light source module of claim 1, further comprising:
   a substrate, wherein the reflector is located between the light guide plate and the substrate, and the substrate is adhered to the reflector.

7. The light source module of claim 6, wherein a material of the substrate is at least one of metal, glass, and a plastic material.

8. The light source module of claim 1, wherein a material of the light guide plate is at least one of glass and an acrylic.

9. The light source module of claim 1, wherein the spacer units are transparent.

10. The light source module of claim 1, wherein the spacer units are randomly distributed between the light guide plate and the reflector.

11. The light source module of claim 1, wherein a material of the spacer units is at least one of a plastic and glass.

12. The light source module of claim 1, wherein a shape of the spacer units is at least one of a ball shape and a column shape.

13. The light source module of claim 1, wherein the optical microstructures are located on the second surface.

14. The light source module of claim 13, wherein a distribution density of the optical microstructures increases in a direction away from the light incident surface.

15. The light source module of claim 1, wherein the optical microstructures are located on the first surface.

* * * * *